Sept. 6, 1966  J. J. MORAVEK ETAL  3,270,568
GYROSCOPE APPARATUS
Filed July 20, 1964  2 Sheets-Sheet 1
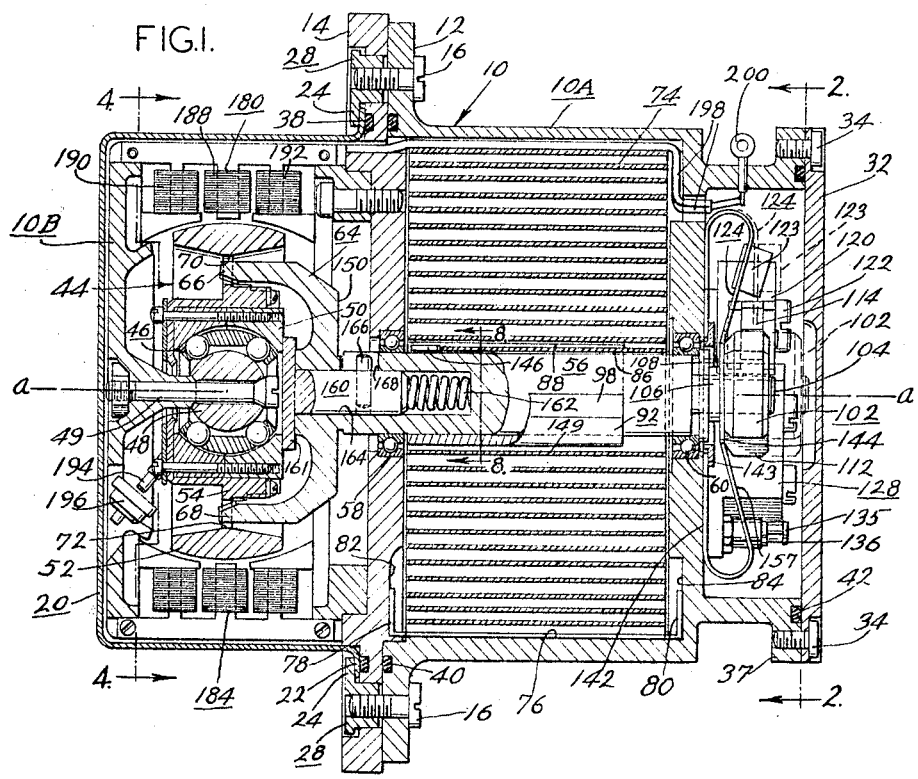
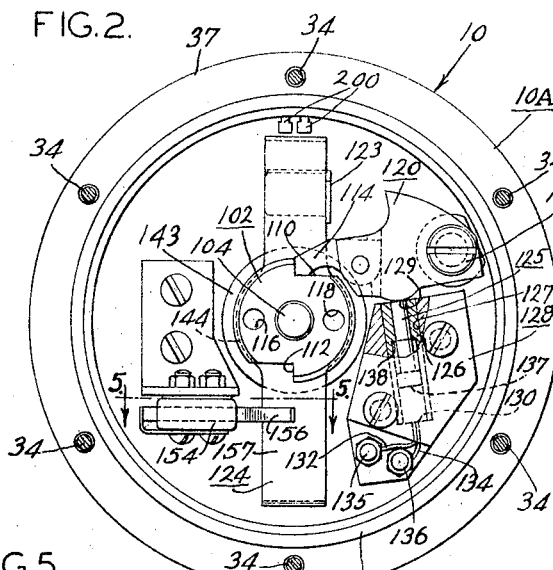
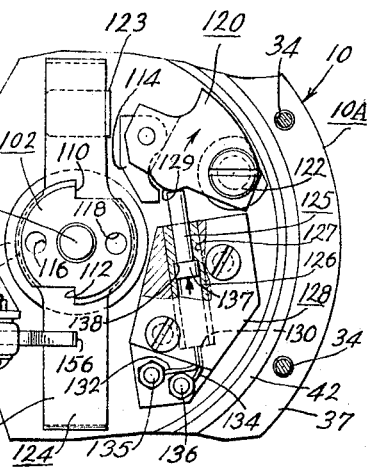
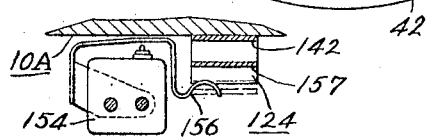
INVENTORS:
ROCCO N. FIGALORA
JOSEPH J. MORAVEK
BY Howson & Howson
ATTYS.

Sept. 6, 1966     J. J. MORAVEK ETAL     3,270,568
GYROSCOPE APPARATUS
Filed July 20, 1964     2 Sheets-Sheet 2
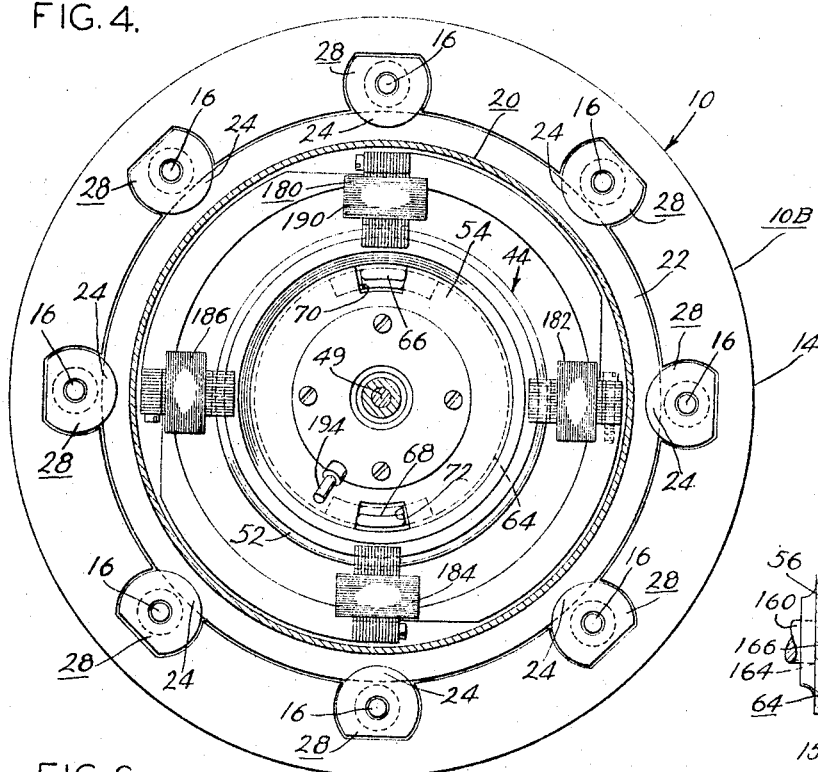
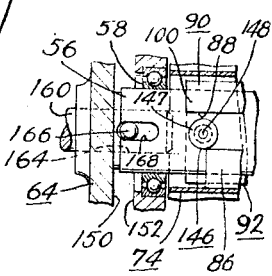
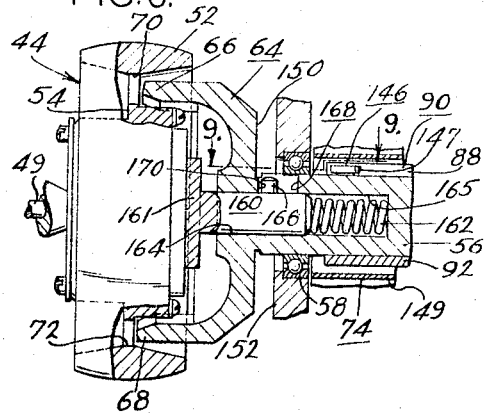
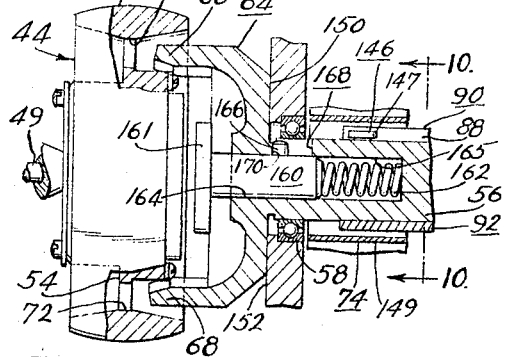
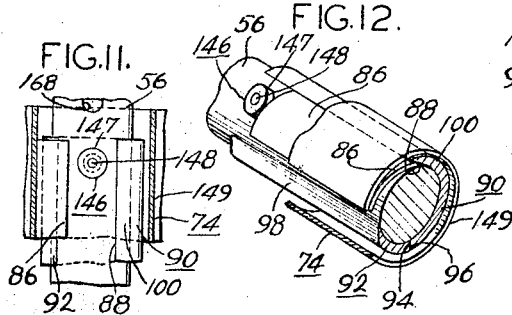
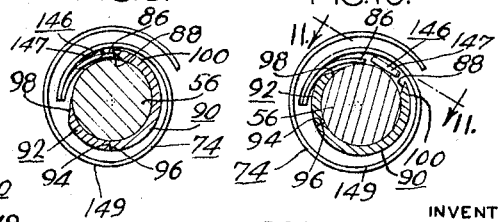
INVENTORS.
ROCCO N. FIGALORA
JOSEPH J. MORAVEK
BY Howson & Howson
ATTYS.

United States Patent Office 3,270,568
Patented Sept. 6, 1966

3,270,568
GYROSCOPE APPARATUS
Joseph J. Moravek, Bethpage, and Rocco N. Figalora, Plainview, N.Y., assignors to American Bosch Arma Corporation, Garden City, N.Y., a corporation of New York
Filed July 20, 1964, Ser. No. 383,774
11 Claims. (Cl. 74—5.12)

The present invention relates to impulse-driven gyroscopes and has particular reference to spring-release and caging-uncaging mechanisms for spring-driven free gyros.

Certain gyroscopes employ a rotatable gyro element which is initially at rest, but which is expected to become operative practically instantaneously upon demand. To fulfill this requirement the gyro element, which typically is in the form of an inertia wheel, is brought up to speed by an energy impulse of relatively short duration. If the gyroscope is required to operate for only a short period of time, as in guidance of certain missiles, no further energy need be supplied to the wheel and the gyroscope will provide adequate directional information of sufficient accuracy. If a longer period of operation is desired, the impulse-started wheel may be kept up to speed by an additional continuous driving energy source, as for example electric motor windings or a pressurized gas supply.

The present invention is used in the early stage of operation of such a gyroscope, i.e. up to the point where the impulse power source is disconnected from the gyro wheel and the wheel uncaged so that it may operate as a free gyro. The particular impulse source under consideration here is that wherein the energy is stored in a coiled spring. Upon demand, the spring is permitted to uncoil (typically within seconds) to bring the wheel up to speed, and the driving connection is severed as soon as the spring is spent to preclude any loss of energy from the spinning wheel back to the driving mechanism. The present invention includes a novel release device which accomplishes this result decisively, reliably, and with a minimum of lost time. As a further feature in one aspect, the invention also provides for caging of the gyro wheel while it is being brought up to speed and for automatic uncaging thereof only after the wheel has been released from the driving mechanism, thereby avoiding application of unbalancing torques to the wheel during said release.

Accordingly it is an object of the invention to provide a new and useful gyroscope of the impulse-driven type.

Another object is to provide such a new and useful gyroscope in which the wheel of the gyroscope is brought up to speed by the uncoiling of a coil spring and then promptly and positively released from restraint by said spring.

Another object is to provide a gyroscope of the latter type which is susceptible to being placed in a primed condition by winding of said spring, and of being suddenly actuated to produce impulse-driving of said gyro wheel by said spring followed by automatic release of the gyro wheel from the spring when the spring becomes spent.

Another object is to provide an impulse-driven gyroscope in which a driving member engages the gyro wheel to drive it in rotation for a limited interval of time and then is disengaged from the wheel and in which said wheel is automatically caged during said interval of driving thereof and automatically uncaged shortly after said disengagement.

These and other objects of the invention are achieved by the provision of a gyroscope employing a supporting frame in which a rotatable gyro element is supported for rotation about a spin axis. A drive shaft for imparting spin to the gyro element is journalled in the frame for both rotational and axial motion with respect to the frame. Clutch means are provided for coupling said drive shaft to said gyro element to drive it in rotation when said drive shaft is rotated in one axial position thereof, and to decouple said drive shaft from said gyro element when the drive shaft is moved to a second axial position thereof. To rotate the drive shaft, a coil spring is provided which acts between the frame and the drive shaft and is releasably connected at its inner end to the drive shaft, so that the coil spring can be wound tightly by rotating said shaft, when unwinding will drive the shaft in rotation and, as soon as it is spent, will release from the drive shaft automatically. Preferably the releasable connection between drive shaft and coil spring is provided by a radially-extending member on said shaft in the form of an overhanging lip, together with a catch in the form of a reverted extension on the inner end of the coil spring, the catch and the lip being circumferentially oriented so as to engage each other when the shaft is rotated in a first direction against the spring or is driven by the spring, and to disengage when the shaft rotates in the opposite direction to move the lip away from said catch. With the drive shaft in said first axial position the above-described unwinding of the coil spring therefore rotates the gyro element by way of the clutch means to bring it up to speed; when the spring has spent enough of its energy that it no longer tends to accelerate the gyro element, the momentum of the shaft, clutch, and gyro causes the lip on the shaft to turn away from the catch on the spring and to rotate free of the catch. At this time it is desired to also disengage the clutch means from the gyro element so the latter element can be free. To accomplish this a release spring is provided which urges the drive shaft toward said second axial position for which the clutch means is disengaged. However, so long as the catch on the coil spring is in engagement with the lip on the shaft, the shaft is prevented from moving to said second axial position by a stop member on the shaft. This stop member is positioned in axial alignment with the position of said catch when engaged by said lip, and in said first axial position of the shaft normally abuts and is urged against the catch by the action of said release spring to prevent the shaft from moving to its second axial position for which the clutch means is disengaged. However, when spending of the coil spring permits the drive shaft to rotate away from the catch on the coil spring, the stop member rotates with the shaft until it is clear of the catch, at which time the shaft is free to snap to its second axial position in response to the release spring as the stop member passes under the first turn of the coil spring. The stop member therefore senses disengagement of the inner end of the coil spring from the drive shaft and permits prompt disengagement of the clutch means from the gyro element so that the latter element may spin freely.

In a preferred form of the invention the stop member is a roller free to rotate about an axis radial to the drive shaft, thereby to minimize frictional drag as it rotates along the end and around the edge of the catch during the above-described operation.

In accordance with a further feature of the invention in one of its aspects, a caging member rotatable with the drive shaft is spring-tensioned against a side of the gyro element by a caging spring while the gyro element is being brought up to speed, thereby to hold it in a predetermined caged position during such time. However, the caging member is axially movable away from the gyro element against the action of the caging spring in response to the above-described automatic motion of the drive shaft from its first to second axial positions, the release spring for moving the drive shaft being stronger than said caging spring. However this uncaging is delayed with respect to disengagement of the clutch means from the gyro element, preferably by means of a lost-motion pickup arrangement operating between the drive shaft and the caging shaft, whereby any unbalancing effects on the gyro element of the disengagement of the clutch means therefrom are prevented from affecting the rotation of the gyro wheel.

Other objects and features of the invention will become more readily apparent from a consideration of the following detailed description taken in connection with the accompanying drawings, in which:

FIGURE 1 is a longitudinal section through the central plane of a gyroscope constructed in accordance with the invention;

FIGURE 2 is a sectional view taken along the line 2—2 of FIGURE 1;

FIGURE 3 is a fragmentary view of the apparatus as shown in FIGURE 2 with certain portions shown in an alternate position occurring during the course of operation;

FIGURE 4 is a sectional view taken along the line 4—4 of FIGURE 1;

FIGURE 5 is a fragmentary sectional view taken along the line 5—5 of FIGURE 2;

FIGURES 6 and 7 are sectional views of a portion of the apparatus as seen in FIGURE 1, illustrating two different conditions of the apparatus during the course of its operation;

FIGURE 8 is a sectional view of a portion of the apparatus shown in FIGURE 1, taken along line 8—8;

FIGURES 9 and 10 are sectional views of a portion of the apparatus shown in FIGURES 6 and 7, taken along lines 9—9 and 10—10, respectively;

FIGURE 11 is a fragmentary sectional view of the portion of the apparatus shown in FIGURE 10, taken along the line 11—11; and FIGURE 12 is a perspective view of the portion of the apparatus shown in FIGURES 1 and 8.

Referring now by way of example only to the specific embodiment of the invention shown in detail in the drawings, there is provided a supporting frame 10 in this case comprising two parts 10A and 10B having mating peripheral flanges 12 and 14, respectively, secured together by bolts such as 16. These flanges also provide appropriate surfaces for mounting the entire instrument to the vehicle or other object with which it is to be used. The supporting frame as well as the remainder of the entire gyroscope is preferably generally symmetrical about the longitudinal axis a—a in FIGURE 1. A cylindrical metal casing 20 is preferably provided over the left-hand part 10B of supporting frame 10, and has a peripheral flange 22 normally held clamped between the frame and the heads, such as 24, of the bolt-retaining members 28 into which the bolts such as 16 are screwed. The right-hand end of the assembly is closed by a cover 32 secured, as by bolts 34, to a flange 37 at the right-hand side of the frame. Appropriate resilient O-rings such as 38, 40 and 42 may be used between casing 20 and frame part 10B, between the two frame parts 10A and 10B, and between cover 32 and frame part 10A, respectively.

A rotatable gyro element 44 is supported for rotation in frame 10 by means of a spherical bearing 46. The spherical inner race 48 of the bearing is fixedly supported to the frame, as by means of a machine screw 49, the outer race 50 of bearing 46 being secured to, and forming a part of, the rotatable gyro element 44. In this example the gyro element comprises an inertia wheel having a heavy rim portion 52 supported on the outer race 50 by a rigid circumferentially-slotted web 54. The gyro element is therefore angularly movable with respect to the frame 10 in any direction, within certain angular limits, and is particularly adapted for rapid rotation about the axis a—a and for angular tilt about two other axes mutually perpendicular to each other and to axis a—a.

Also provided is a rotatable drive shaft 56 loosely joined in frame 10 by means of bearings 58 and 60 so as to permit both rapid rotation of the drive shaft 56 about the axis a—a and also to permit axial translational motion of the drive shaft along axis a—a in bearings 58 and 60.

Clutch means are also provided for coupling driving power from driving shaft 56 to gyro element 44 when the drive shaft 56 is in the axial position shown in FIGURE 1, and for decoupling the driving shaft from the gyro element when the drive shaft 56 is moved to the right as shown in FIGURE 7 for example. In the present example this clutch means comprises a driving yoke 64 having a pair of axially-extending finger members 66 and 68 symmetrically disposed with respect to axis a—a, the yoke being secured to, and in this case integral with, drive shaft 56. In a first axial position of drive shaft 56 for which rotational power is to be coupled to the gyro element 44, the leftwardly-extending tips of the finger members 66 and 68 extend into and through a pair 70 and 72, respectively, of circumferentially-extending slots in the web 54. Rotation of drive shaft 56 therefore provides driving rotational motion for gyro element 44 by urging the tips of the finger members 66 and 68 circumferentially against the edges of slots 70 and 72. However, when drive shaft 56 is moved axially to the right from the driving position shown in FIGURE 1 to the second axial position shown in FIGURE 7 for example, the tips of the finger members 66 and 68 are disengaged from the slots in web 54 so that the gyro element 44 can rotate independently of the yoke 64 and shaft 56. As will be described in more detail hereinafter, the drive shaft 56 is maintained in its first axial position shown in FIGURE 1 during the time when the gyro is to be brought up to operating rotational speed by means of stored spring power acting on the drive shaft, and is disengaged from web 54 substantially as soon as the spring energy has been dissipated, so as not to interfere with the later operation of the gyro element for gyroscopic purposes.

The means for bringing the drive shaft 56 up to operating speed comprises a coil spring 74 in the form of an involuted sheet of spring metal having its radially outward end secured to frame 10 and its radially inward end releasably secured to drive shaft 56. More particularly, the walls of frame 10 form a chamber 76 within which the coil spring 74 is located, and the outer end of the coil spring is secured to frame 10 by means of tabs 78 and 80 formed at the outer end of the coil spring at opposite axial extremes thereof and positioned within slots 82 and 84 of limited circumferential extent in the side walls of chamber 76 to prevent rotation of the outer end of the spring.

To secure the inner end of coil spring 74 releasably to drive shaft 56, the inner end of the coil spring is provided with a catch 86 forming a reverted extension of a portion of the inner end of the coil spring, as is made particularly clear in FIGURES 8, 10 and 12. The catch 86 is preferably formed from a separate strip of metal spot-welded into the position shown at the end of the coil spring 74, although it may be provided instead by merely crimping the inner end of the spring into a reverted shape. The free end of the catch 86 is adapted to pass under and engage the raised edge of an axially-extending lip 88 on the outside of drive shaft 56. In this example the lip 88 runs nearly the entire axial width of coil spring 74, and, as shown in FIGURES 8, 10 and 12, may be formed by a substantially semi-cylindrical piece of metal 90 closely fitting about, and secured to, drive shaft 56, as by means of countersunk screws for example. A second cylindrically-shaped piece 92 of the same axial length as piece 90 is also secured to drive shaft 56, as by countersunk screws. Adjacent ends 94, 96 of the pieces 90 and 92 abut each other to form a single smooth outer surface, the opposite end 98 of piece 92 being tapered downward to the outer diameter of shaft 56 to provide a smooth transition thereto. The other end 100 of piece 90 is formed at an angle to the radius of shaft 56 to produce the overhanging lip 88 which points in a direction to catch and temporarily secure the catch 86 on the inner end of coil spring 74 when drive shaft 56 is rotated counterclockwise as viewed in FIGURE 8. If desired, the other end 100 of piece 90 may be provided with a shoulder for receiving the free end of the catch 86 to minimize the possibility of jamming of said free end beneath the overhanging lip.

Coil spring 74 is of such dimensions, that even when completely spent, the catch 86 thereon remains sufficiently close to drive shaft 56 to engage the overhanging lip 88 upon counter-clockwise rotation of shaft 56, so that continued counter-clockwise turning of drive shaft 56 will then result in a winding-up of the coil spring 74. On the other hand, after the coil spring 74 has been wound and is permitted to unwind to drive shaft 56 clockwise in FIGURE 8, the spring 74 remains in a spent position such as is shown in FIGURES 8 and 10, while the momentum of the drive shaft 56, yoke 64 and the gyro element 44 causes the drive shaft to continue to rotate clockwise until lip 88 is disengaged from the catch 86 on the coil spring 74 as shown in FIGURE 10. As will be described hereinafter in detail, this disengagement of catch and lip is used to trigger the disengagement of yoke 64 from gyro element 44.

A suitable arrangement for winding, latching and unlatching the coil spring 74 is shown particularly clearly in FIGURES 2 and 3 taken together with FIGURE 1. A special nut 102 having a left-hand thread is screwed onto a similarly-threaded stub shaft 104 constituting an extension of drive shaft 56. Also threaded on stub shaft 104 is a collar 106 which is locked at a particular position along shaft 104 by screwing nut 102 along shaft 104 until it bears against collar 106. Collar 106 has a peripherally-extending flange 108 serving as a stop adapted to contact, and to be arrested by, the inner race of bearing 60 when drive shaft 56 is urged to the left in FIGURE 1. The position of collar 106 on stub shaft 104 is adjusted until upon such contact between collar 106 and the inner race of bearing 60 the finger members 66 and 68 of yoke 64 extend just sufficiently into slots 70 and 72 in web member 54 to provide driving engagement therewith. Nut 102 also has a pair of diametrically-opposed notches 110 and 112 cut into the periphery thereof and adapted to be engaged by pawl member 114 when, between spring-winding impulses, the coil spring 74 tends to unwind. Also provided are a pair of diametrically-opposed holes 116 and 118 in the outer face of nut 102 into which a pair of prongs of a special tool resembling a brace may be inserted for exerting a turning torque on nut 102 to turn drive shaft 56 and wind up coil spring 74.

The pawl member 114 is part of a compound linkage the other portion of which comprises a pivoted arm 120 mounted on frame 10 by means of pivot 122. With the gyroscope axis a—a horizontal, the pivot arm 120 and pawl member 114 are normally in their lower-most position as shown in FIGURES 1 and 2, so that pawl member 114 falls successively into the notches 110 and 112 as coil spring 74 is wound up, thus preventing unwinding both during temporary interruption of the winding action and after winding is completed. When it is desired to trigger the wound coil spring 74 so as to drive the shaft 56 in rotation, the pivoted arm 120 is driven upward from the position shown in FIGURE 2 to that shown in FIGURE 3, the pawl member 114 at the same time pivoting downwardly to the position shown in FIGURE 3 so as to be entirely clear of the remainder of the mechanism. To insure that pawl member 114 will pivot downwardly to the position shown, rather than possibly sticking in a horizontally-extending position, a block 123 is preferably mounted on the release spring 124 in a position such that pawl member 114 strikes the block 123 as it is being raised to the position shown in FIGURE 3 and hence is forced to rotate to the downwardly-extending position shown in FIGURE 3; the main function of release spring 124 will be described presently.

To provide automatic actuation of the unlatching mechanism for spring 74, there is employed a piston 125 mounted for upward axial motion in a cylinder 126 contained within a cylindrical bore 127 in a block 128 on frame 10. In the position shown in FIGURE 2, piston 125 is contained entirely within cylinder 126 and a cam surface 129 on the underside of arm 120 overlies the upper end of the piston. Preferably piston 125 is moved outwardly and upwardly against the cam surface 129 on pivot arm 120 by pressure created on its inner end by an explosion of charge in the lower portion 130 of bore 127. Electrical leads 132 and 134 connected to terminals 135 and 136 may be provided to ignite the explosive charge in response to the closing of an external switch connected to an external power source (not shown). In this manner the coil spring 74 may be released by remote electrical control. Preferably piston 125 is provided at its inner end with flange 137 and cylinder 126 is provided with a shoulder 138 against which flange 137 bears when urged upwardly, to provide a pressure seal. In this way the pressure generated by explosion of charge in the lower portion 130 of bore 127 will be maintained beneath the piston so that the piston will be held in the upward position of FIGURE 3 throughout the operation of coil spring 74.

The drive shaft 56 is continually urged by release spring 124 from the first axial position shown in full line in FIGURE 1, in which the fingers of yoke 64 engage the web 54 of the gyro element 44, toward a second axial position further to the right in which the yoke fingers 66 and 68 are disengaged from the slots in web 54, the location of spring 124, block 123 and nut 102 for this second axial position of the drive shaft being indicated in broken line in FIGURE 1. The release spring 124 in this embodiment comprises a double U-bend leaf spring having one portion such as 142 secured to frame 10 at 143, and another, outer portion such as 144 encircling stub shaft 104 and bearing against the inner (left-hand) surface of nut 102 so as to urge nut 102 and drive shaft 56 to the right in FIGURE 1 even when shaft 56 rotates.

However, when the coil spring 74 is in its wound condition, such axial motion of shaft 56 to the right is prevented by a stop member 146 secured to the outer surface of drive shaft 56 at the left of coil spring 74 and bearing against the catch 86 thereof, as shown particularly clearly in FIGURES 1 and 12 for example. Preferably stop member 146 comprises a disc-shaped roller 147 mounted for easy rotation about a shaft 148 radial to drive shaft 56, and having its lower surface just clear of the outer surface of shaft 56. As is seen particularly clearly in FIGURES 8 and 12, with coil spring 74 in its fully wound state as shown in FIGURE 1, stop member 146 is positioned circumferentially on shaft 56 adjacent lip 88 so as to be axially aligned with catch 86 of coil spring 74 when said catch is in driving contact with lip 88, and is of sufficient size to abut and bear against catch 86 in response to the action of release spring 124. However, as shown particularly clearly in FIGURE 10, stop member 146 is sufficiently small to pass beneath the first coil 149 of coil spring 74, at least when coil 74 has unwound.

Accordingly, as shown particularly clearly in FIGURE 10, when the energy of coil spring 74 is spent, the catch 86 thereon no longer moves rotationally with shaft 56, while shaft 56 continues to rotate clockwise in FIGURE 10 due to its own momentum and that of gyro element 44 to which it is coupled, and hence rotates clockwise with respect to spring 74 until stop member 146 rolls past the end of catch 86, as shown in FIGURE 9, and permits shaft 56 to snap to its most rightward position under the action of release spring 124, stop member 146 passing beneath the first coil 149 of coil spring 74. FIGURE 11 shows the positions of stop member 146 and shaft 56 after stop member 146 has cleared catch 86 and moved axially under the action of release spring 124. Since yoke 64 is attached to shaft 56, it also moves to the right from the position in which it engages web 54 as shown in FIGURE 1, to the position in which its rightward motion is arrested by abutment of its right-hand side 150 against the portion 152 of frame 10 as shown in FIGURE 7, axial motion of shaft 56 of course also being arrested by this abutment.

The rolling action of roller 147 of stop member 146 along the end of catch 86 permits easy rotational motion of shaft 56 with respect to catch 86, so as to minimize the drag of sliding friction which would otherwise occur during the above-described process.

It will therefore be appreciated that the mechanism just described responds to the occurrence of a spent condition of coil spring 74, as indicated by the occurrence of rotational motion between shaft 56 and spring 74, promptly to disengage the finger members 66 and 68 of yoke 64 from the corresponding slots 70 and 72 in web 54 of gyro element 44, so that the gyro element thereafter can continue to spin free of restriction by back-coupling to coil spring 74.

As is shown particularly clearly in FIGURES 1, 2 and 5, electrical signals indicative of sufficient motion of shaft 56 to the right to free gyro element 44 from yoke 64 may be provided by mounting a microswitch 154 on the right-hand outer face of frame 10 as viewed in FIGURE 1, the spring arm 156 of the microswitch being positioned so as to be actuated by the outer surface 157 of release spring 124 only when said surface has moved from the position shown in full line in FIGURE 5, for which yoke 64 engages gyro element 44, to the position shown in broken line in FIGURE 5, for which the yoke has been disengaged from the gyro element 44.

To cage and uncage the gyro element 44 in accordance with a further feature of the invention in one aspect, there is provided a caging shaft 160, as shown for example in FIGURES 1, 6, 7 and 9, having a flanged end 161, the caging shaft 160 being mounted slidably within and coaxially with the drive shaft 56 and being urged toward gyro element 44 by a caging spring 162. Thus a central bore 164 is provided at the left-hand end of drive shaft 56, as viewed in the latter figures, to accommodate caging shaft 160 and the caging spring 162 is mounted in the chamber 165 formed between the right-hand end of caging shaft 160 and the bottom of bore 164. When drive shaft 56 is in its first, or left-most, axial position for which yoke 64 engages gyro element 44, the effect of caging spring 162 is to urge the flat end surface of flanged end 161 of the caging shaft against a corresponding flat caging surface on the adjacent side of the outer race of bearing 46.

Caging shaft 160 is provided with a radially-extending pin 166 affixed thereto, which protrudes into an axial slot 168 in the wall 169 of drive shaft 56. Pin 166 therefore serves to couple rotational power from drive shaft 56 to caging shaft 160 and to cause caging shaft 160 to rotate with drive shaft 56. Slot 168 extends axially toward gyro element 44 sufficiently to permit flanged end 161 of caging shaft 160 to bear against the side of gyro element 44, as shown in FIGURE 1, when the gyro element is engaged by the driving yoke 64 and to hold the spin axis of the gyro element 44 in a fixed angular position normal to axis a—a. Further, slot 168 extends axially toward yoke 64 from pin 166 by a predetermined amount such that drive shaft 56 can move axially to the right by a predetermined distance before the end 170 of slot 168 engages pin 166. Release spring 124 is stronger than caging spring 162 so that, when coil spring 74 has unwound and drive shaft 56 has moved to the right in FIGURE 1 in response to release spring 124 sufficiently for the end 170 of slot 168 to contact pin 166, the caging shaft 160 is picked up and carried along to the right with the drive shaft, thus removing the flanged end 161 of caging shaft 160 from contact with the gyro element 44 and uncaging it.

The arrangement of pin 166 and slot 168 therefore comprises a lost-motion pick-up mechanism by means of which the gyro element 44 is uncaged only after drive shaft 56 has moved a predetermined distance away from gyro element 44. The positions and sizes of pin 166 and slot 168 are such that the gyro element 44 is uncaged only after the fingers 66 and 68 of yoke 64 have been retracted out of slots 70 and 72 by axial motion of shaft 56. This action is illustrated clearly in FIGURES 6 and 7, FIGURE 6 illustrating the position of drive shaft 56 for which the yoke fingers 66 and 68 are just disengaged from the slots 70 and 72 in web 54, the flanged end 161 of caging shaft 160, however, still bearing against the side of gyro element 44. FIGURE 7 illustrates the condition in which the drive shaft 56 has moved sufficiently further to the right that pin 166 has been picked up by the trailing end 170 of slot 168 and flanged end 161 moved out of contact with gyro element 44 to permit free-gyro operation. By this arrangement it is assured that the gyro element 44 will be released into its free state with its spin axis oriented along the axis a—a of FIGURE 1, without interference by action of fingers 66 and 68 on gyro element 44 during disengagement of the yoke 64 from the gyro element.

Appropriate electrical pickoffs, such as 180, 182, 184 and 186 of FIGURE 4, may be provided at 90° intervals around the rim of the gyro element 44 to provide electrical indications of tilt of the spin axis thereof with respect to frame 10. As exemplified by pickoff 180 in FIGURE 1, each pick-off may comprise a central primary coil 188 aligned with the center of wheel rim 52 when the gyro spin axis is along axis a—a, and supplied with alternating current; and two secondary coils 190 and 192 spaced symmetrically on opposite sides of primary coil 188. This differential-transformer type of pickoff and the nature of its electrical interconnections to the other similar pickoffs are well known in the art and hence need not be described in detail herein.

To monitor the rotational speed of the gyro, a permanent magnet 194 may be mounted on the rim of the gyro element 44 so as to sweep past a pick-up coil 196 once for each rotation of the gyro element 44; the frequency of pulses induced in coil 196 then indicates the gyro spin rate. Where such a magnet 194 is employed, the gyro may be balanced by adding a diametrically-opposed balancing weight to the gyro wheel.

Electrical power input and electrical signal output for the above-described pickoffs and spin-rate monitoring arrangement may be provided by way of electrical cables 198 connected to terminals 200.

Typical operation of the apparatus described above is as follows.

With the frame 10 held steady in a fixture and with cover 32 removed, a special tool is inserted in the holes 116 and 118 of the special nut 102. The tool is rotated about axis a—a of FIGURE 1 until finger members 66 and 68 are aligned with slots 70 and 72. Shaft 56 is then forced inward, i.e. to the left in FIGURE 1, by pressing on the tool until fingers 66 and 68 enter slots 70 and 72. This also stresses the release spring 124 and urges the end of the caging shaft 160 against the gyro element 44. While continuing to press shaft 56 inwardly, the tool is turned counter-clockwise as viewed in FIGURE 2 and, after lip 88 engages the catch 86 on coil spring 74, continued rotation of the tool winds up the coil spring 74. At each half turn of shaft 56 the pawl member 114 drops into a notch in nut 102 and prevents the spring from unwinding. Once winding has started the stop member 146 will prevent the drive shaft 56 from springing outwardly, and hence the inward force of the tool is no longer necessary during the further winding of the spring. To obtain a standard operation from different gyros, the coil spring 74 is normally wound by a specified number of turns of shaft 56, for example fifteen. When the spring 74 has thus been wound up, the cover 32 is replaced and the gyro is ready for use.

When the gyroscope is to be brought up to speed and used, an electrical current is applied to terminals 135 and 136 to explode a charge in bore 127, thereby kicking pawl member 114 out of its notch in nut 102 and holding it in the position shown in FIGURE 3. This permits spring 74 to unwind suddenly and bring the gyro element quickly up to speed. When the spring 74 is spent, stop member 146 moves clear of the catch 86 on coil spring 74, permitting release spring 124 to snap drive shaft 56 to its extreme right-hand position for which the yoke 64 is disengaged from gyro element 44. During the course of travel of yoke 64 to the right the caging shaft 160 is picked up and moved sufficiently to the right to uncage the gyro element. The latter operation occurs only after the fingers 66 and 68 of yoke 64 have been moved sufficiently to the right to stand free of the gyro element 44.

While the invention has been described with particular reference to specific embodiments thereof in the interests of complete definiteness, it will be understood that it may be embodied in any of a large variety of forms without departing from the spirit and scope of the invention as defined by the appended claims.

We claim:
1. An impulse-driven gyroscope comprising:
a supporting frame;
a rotatable gyro element supported for rotation on said frame;
a drive shaft journalled in said frame for both rotational and axial motion with respect to said frame;
clutch means driven in rotation by rotation of said shaft and movable by axial motion of said shaft into and out of driving engagement with said gyro element, thereby to permit rotation of said gyro element by said shaft when said shaft is in a first axial position and to permit rotation of said gyro element free of said clutch means when said shaft is in a second axial position;
coil spring means comprising a coil spring around said shaft, and having its inner end releasably connected to said shaft for driving said shaft in rotation as said spring unwinds and for releasing from said shaft when said spring is spent;
release spring means urging said shaft toward said second axial position; and
stop means on said shaft abutting a portion of said coil spring means when said coil spring is tightly wound to prevent said shaft from moving from said first to said second axial position, said stop means being clear of said portion of said coil spring means when said coil spring is spent to permit said shaft to move to said second axial position in response to said release spring means, whereby said clutch means is disengaged only when said coil spring is spent.

2. Apparatus in accordance with claim 1, comprising also means for contacting said gyro element to hold fixed its plane of rotation while said clutch means is engaged with said gyro element and for freeing said gyro element only after said clutch means is disengaged.

3. Apparatus in accordance with claim 2, in which said means for contacting said gyro element comprises a caging member having a surface abuttable against said gyro element to hold it in a fixed plane of rotation, said caging member being rotatable coaxially with said shaft and axially movable with respect to said shaft, a spring member for urging said surface against said gyro element while said clutch means engages said gyro element, and lost-motion pick-up means extending between said shaft and said caging member for urging said surface out of contact with said gyro element only after said clutch means is disengaged from said gyro element.

4. In an impulse drive mechanism for gyroscopes:
a frame;
an inertia wheel;
universal bearing means for supporting said wheel in said frame;
a drive shaft journalled in said frame and adapted for rotational and axial motion within said frame;
clutch means on one end of said shaft for engaging said wheel;
release spring means on the opposite end of said drive shaft urging said drive shaft away from said wheel and tending to release said clutch means;
coil spring means disposed around said drive shaft for driving said drive shaft in rotation and having an inner end separable from said drive shaft;
radially-protruding means on said drive shaft for temporarily locking said inner end of said coil spring means to said drive shaft; and
stop means on said drive shaft and abutting said inner end of said coil spring means when said coil spring means is wound tight for preventing disengagement of said clutch means by said release spring means and for permitting disengagement of said clutch means by said release spring means when said coil spring means is separated from said drive shaft.

5. In the mechanism of claim 4, caging shaft means axially slidable within said drive shaft, caging spring means urging said caging shaft means toward said intertia wheel whereby said caging shaft means is urged against said wheel when said clutch means is engaged, and limit stop means between said caging shaft means and said drive shaft for limiting axial motion therebetween, whereby axial movement of said drive shaft by said release spring means also disengages said caging shaft means from said wheel and said clutch means is released before said caging shaft is disengaged.

6. A spring-driven gyroscope, comprising:
a frame;
a gyroscope inertia wheel journalled in said frame;
a drive shaft coaxial with said wheel and journalled in said frame for rotational and axial motion with respect to said frame;
clutch means on one end of said shaft for engaging and driving said wheel when said drive shaft is in a first axial position, and for disengaging from said wheel when said drive shaft is in a second axial position to permit said wheel to coast in rotation;
a coiled sheet spring disposed about said drive shaft, having one of its opposite ends secured to said frame and its other end releasably connectable to said drive shaft;
a radially-extending member on said shaft for temporarily connecting said other end of said spring to said drive shaft when said drive shaft is turned in one rotational sense to tighten said spring, and for releasing said other end when said spring is unwound and said drive shaft turns in the opposite rotational sense with respect to said spring;
means for latching said shaft against rotation by said spring;
means for releasing said latching means to produce rotation of said drive shaft by said spring until said spring is unwound and said other end of said spring is released from said drive shaft;
release spring means urging said drive shaft toward said second axial position thereof; and
stop means positioned on said drive shaft adjacent one side of said coiled sheet spring and extending outwardly from said drive shaft sufficiently to abut and to be urged against said one side of said coiled sheet spring by said release spring means when said drive shaft is in said first axial position, said stop means being sufficiently small to clear said coiled sheet spring when said last-named spring is unwound and said drive shaft has rotated with respect to said spring in response to the momentum of said wheel, said clutch means, and said drive shaft, whereby said drive shaft is permitted to move to said second axial position as said stop means moves along beneath the innermost coil of said coiled sheet spring in response to said release spring means.

7. The gyroscope of claim 6, in which said radially-protruding means comprises an outwardly-protruding, axially-extending lip on said drive shaft and said other end of said coiled sheet spring comprises a reverted portion extending less than completely around said drive shaft and adapted to engage said lip when said drive shaft is turned in the direction to wind said last-named spring.

8. The gyroscope of claim 7, in which said stop means abuts said reverted portion of said coiled sheet spring when said last-named spring is tightly wound.

9. The gyroscope of claim 8, in which said stop means comprises a roller rotatable about an axis radial to said shaft and in rolling abutment with said reverted portion of said spring when said spring is tightly wound.

10. The gyroscope of claim 7, comprising also a caging shaft having one end slidably mounted within, and coaxially with, said drive shaft, a caging flange on the other end of said caging shaft for bearing against one side of said wheel to hold it in a desired caged position, caging spring means acting between said drive shaft and said caging shaft to urge said caging flange against said one side of said wheel, a slot in one of said caging shaft and said drive shaft, and a pin extending radially into said slot from the other of said caging shaft and said drive shaft to provide rotational driving of said caging shaft by said drive shaft and to permit limited axial sliding motion between said drive shaft and said caging shaft, said slot being longer than the axial thickness of said pin, said slot being located to permit said drive shaft to move axially sufficiently with respect to said drive shaft to provide disengagement of said clutch means before said pin causes said caging flange to be moved axially away from said wheel.

11. The gyroscope of claim 10, in which said inertia wheel is provided with at least one recess radially spaced from its axis of rotation, and in which said clutch means comprises finger means extending into said at least one recess when engaging said wheel, said finger means being withdrawn from said at least one recess when said clutch means is disengaged.

References Cited by the Examiner

UNITED STATES PATENTS 2,918,869  12/1955  Cummings et al. _____ 74—5 X
2,982,140  5/1961   Bennett _____ 74—5.12

FRED C. MATTERN, Jr., *Primary Examiner.*

BROUGHTON G. DURHAM, MILTON KAUFMAN, *Examiners.*

T. W. SHEAR, P. W. SULLIVAN, *Assistant Examiners.*